United States Patent
Grove

(10) Patent No.: US 7,275,787 B1
(45) Date of Patent: Oct. 2, 2007

(54) COMBINED SECOND SEAT, BACKREST AND LUGGAGE RACK FOR A MOTORCYCLE

(76) Inventor: James E. Grove, 4316 Marina City Dr., #423CTN, Marina del Rey, CA (US) 90292

( * ) Notice: Subject to any disclaimer, the term of this patent is extended or adjusted under 35 U.S.C. 154(b) by 225 days.

(21) Appl. No.: 11/216,598

(22) Filed: Aug. 31, 2005

(51) Int. Cl.
*B60J 1/00* (2006.01)
(52) U.S. Cl. ............ 297/215.12; 297/243; 297/215.11; 297/195.12; 297/195.13; 297/215.1
(58) Field of Classification Search ............ 297/195.1, 297/195.11, 195.12, 195.13, 215.1, 215.11, 297/215.12, 243; 16/304, 307; 280/288.4
See application file for complete search history.

(56) References Cited

U.S. PATENT DOCUMENTS

| | | | | |
|---|---|---|---|---|
| 3,380,353 | A * | 4/1968 | Mittermayer | 493/217 |
| 4,462,634 | A * | 7/1984 | Hanagan | 297/201 |
| 4,993,731 | A | 2/1991 | Fuller | |
| 5,608,957 | A | 3/1997 | Hanagan | |
| 5,931,360 | A * | 8/1999 | Reichert | 224/413 |
| 6,007,150 | A * | 12/1999 | Clerkin et al. | 297/215.12 |
| 6,224,081 | B1 * | 5/2001 | Wayman et al. | 280/288.4 |
| 6,347,804 | B1 | 2/2002 | Seibel | |
| 6,390,220 | B1 * | 5/2002 | Galbraith et al. | 180/219 |
| 6,422,648 | B1 | 7/2002 | Hanagan | |
| 6,443,344 | B1 | 9/2002 | Nicosia et al. | |
| 6,659,547 | B2 | 12/2003 | Petersen | |
| 6,840,344 | B2 * | 1/2005 | Galbraith et al. | 180/219 |
| 6,907,952 | B2 * | 6/2005 | Jones | 180/205 |
| 2002/0175543 | A1 | 11/2002 | Nicosia et al. | |
| 2004/0256897 | A1 | 12/2004 | Ziegler | |

* cited by examiner

*Primary Examiner*—David Dunn
*Assistant Examiner*—Erika Garrett
(74) *Attorney, Agent, or Firm*—Jack C. Munro; Sandy Lipkin

(57) ABSTRACT

A combined second seat, backrest and luggage rack for a motorcycle which comprises a frame composed of a pair of tubular members, each in a mirror image of the other, mounted together by an adjusting link which provides for variable spacing of the side members of the frame. A hinge plate assembly composed of a pair of plates which are pivotally connected together is mounted on the frame with one plate not being mounted on the frame and that plate being movable between a position in juxtaposition with the plate that is mounted on the frame to a position that is transverse relative to the plate that is mounted on the frame. A cushion is to be mounted on this transverse plate and when that transverse plate is in its transverse position is capable of the unit being used as a backrest for an operator of a motorcycle, and when in juxtaposition with the plate that is mounted on the frame, this cushion is usable as a second seat for a motorcycle. When the plate is transverse, the frame can also be used as a luggage rack.

4 Claims, 7 Drawing Sheets

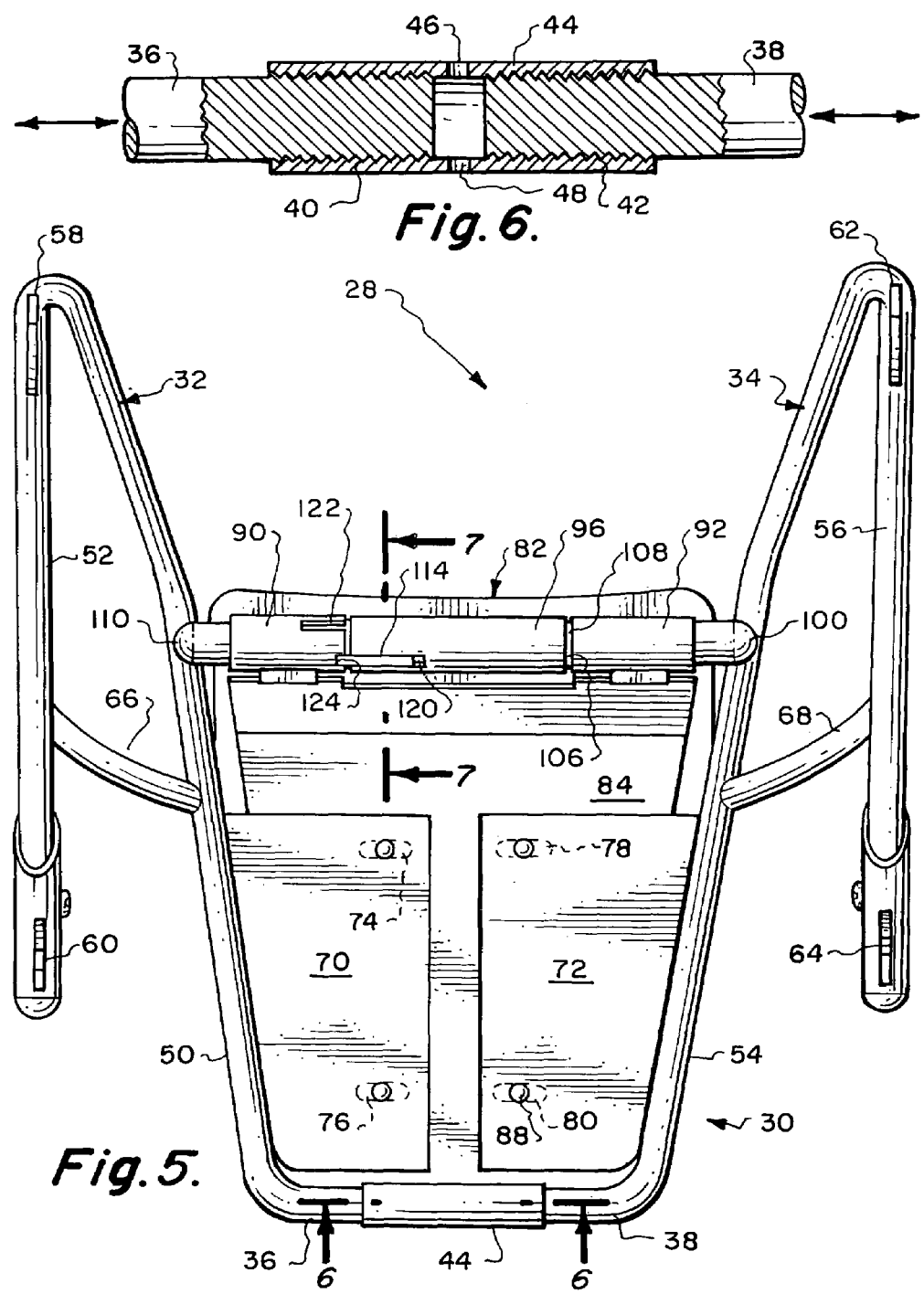

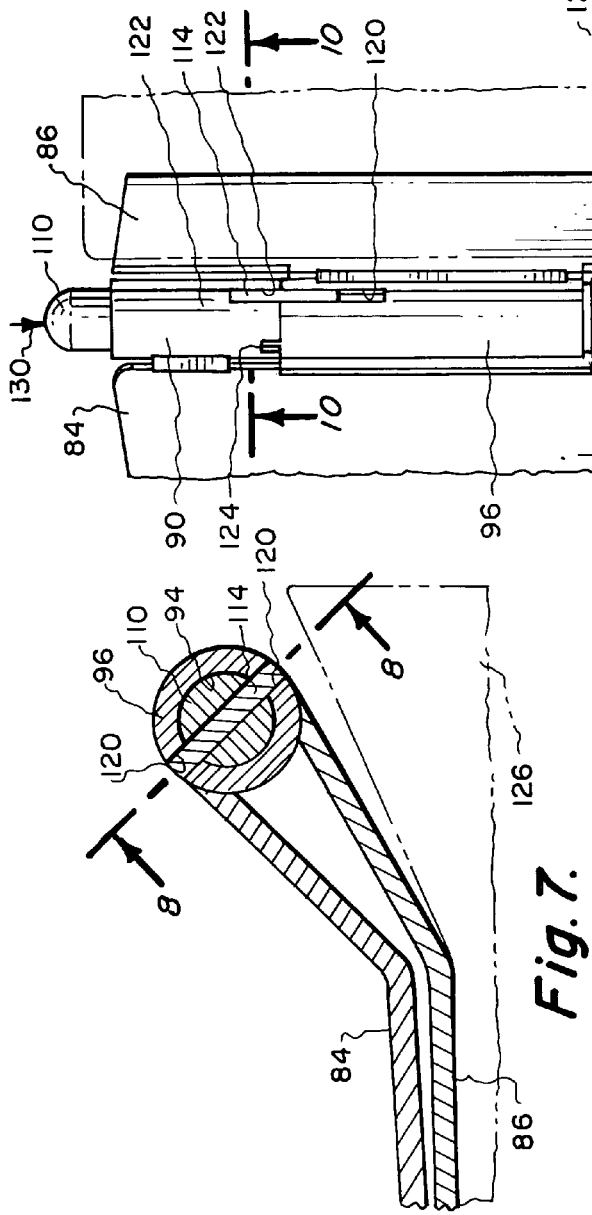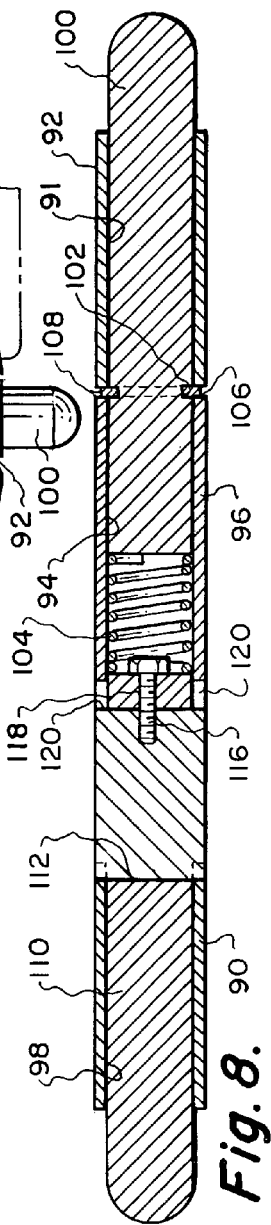

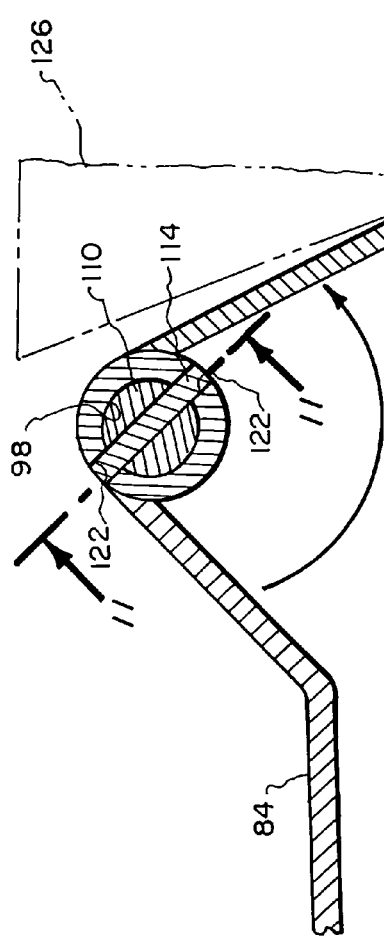
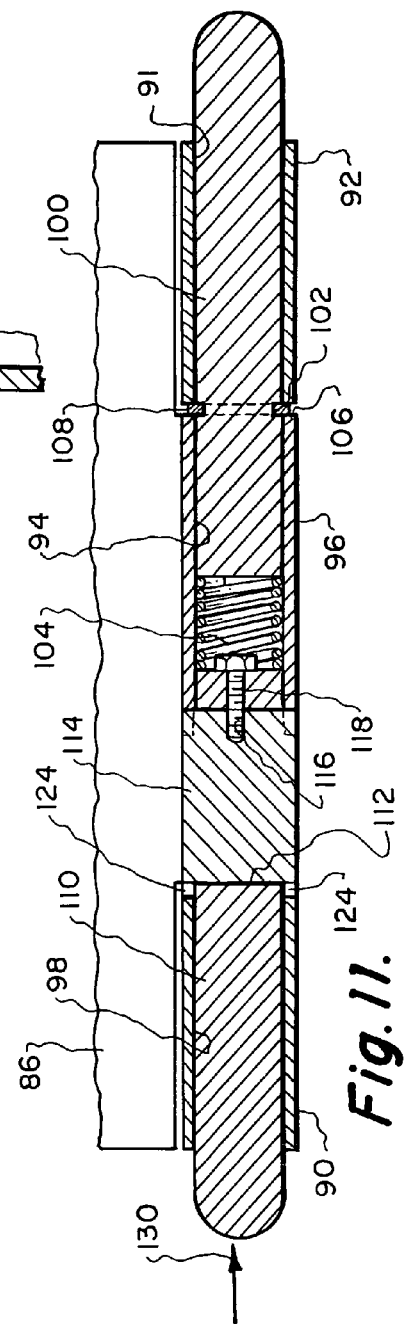

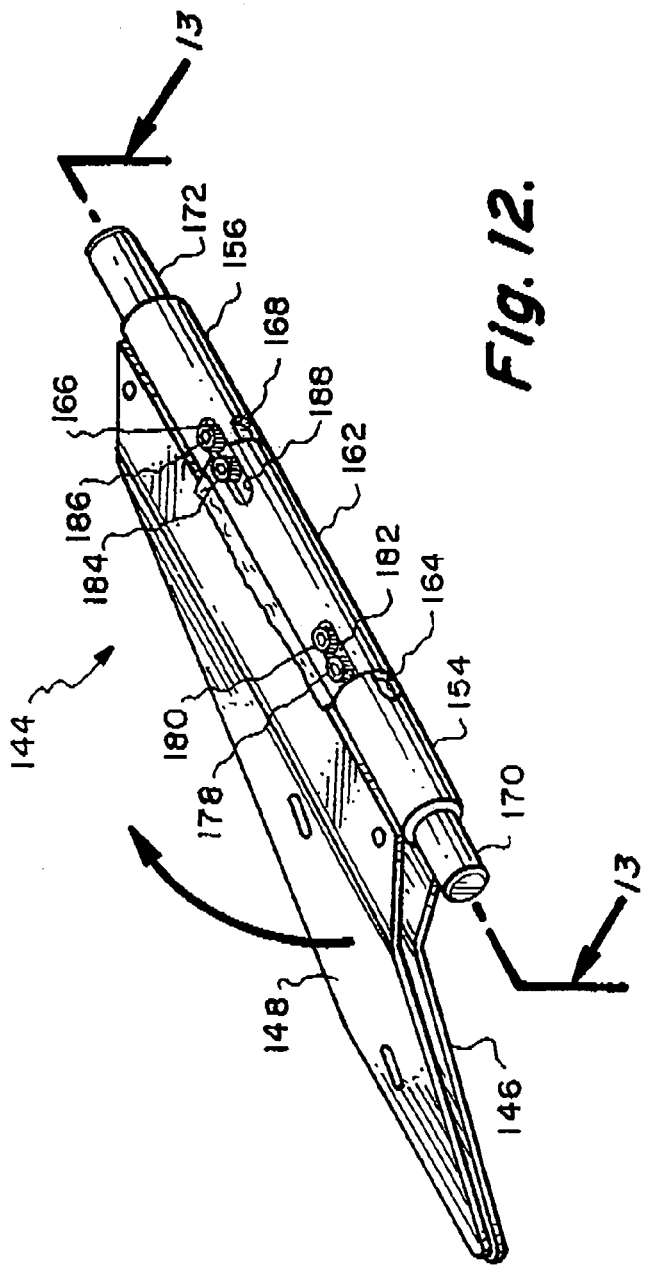
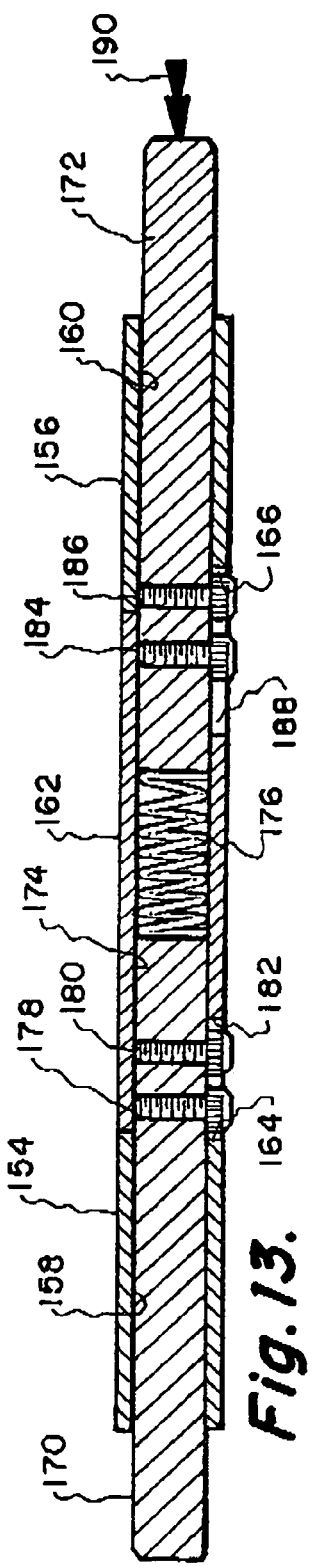
Fig. 12.
Fig. 13.

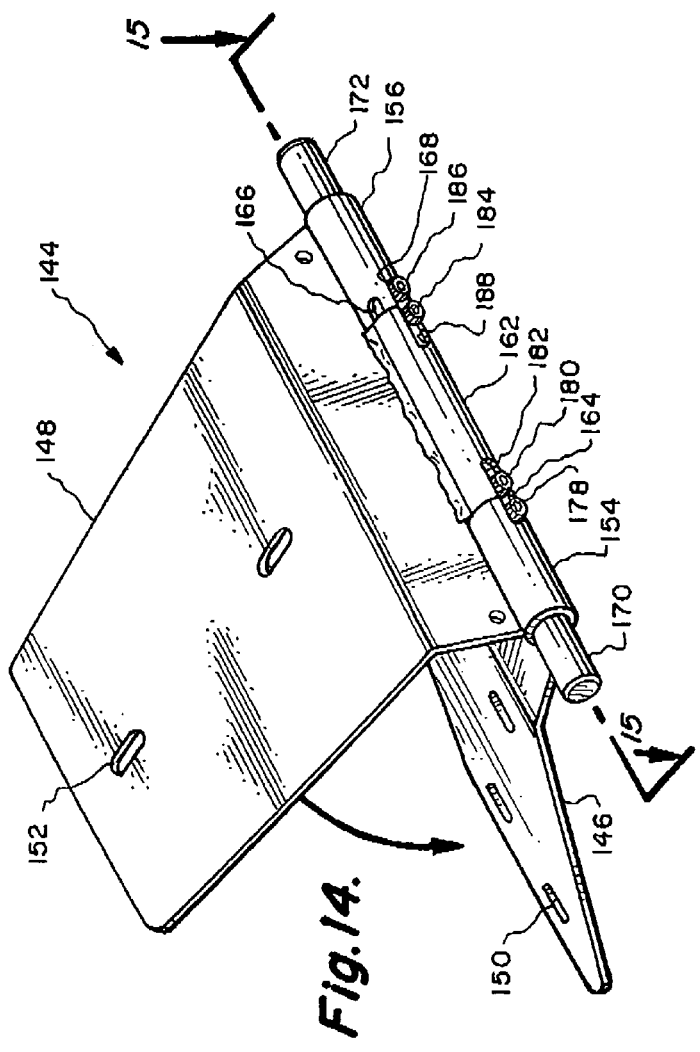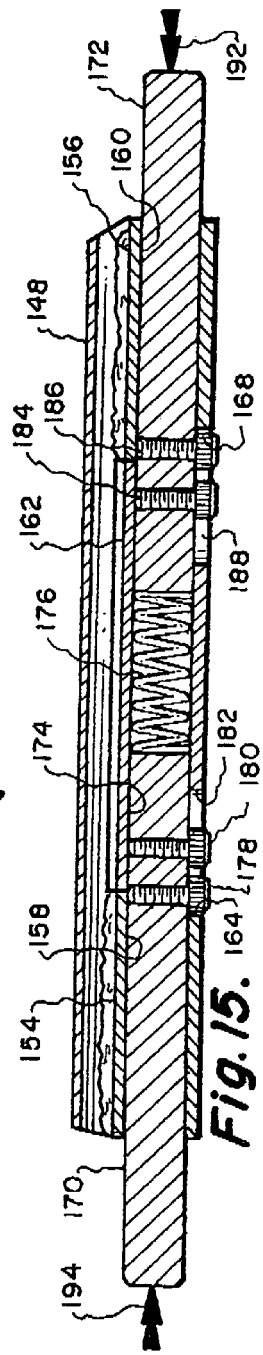

COMBINED SECOND SEAT, BACKREST AND LUGGAGE RACK FOR A MOTORCYCLE

BACKGROUND OF THE INVENTION

1. Field of the Invention

The present invention relates to an accessory for a motorcycle and more particularly to an accessory that can be used not only as a second seat for a motorcycle but also as a backrest for the operator of the motorcycle and also as a luggage rack.

2. Description of the Related Art

Motorcycles are experiencing a constantly increasing widespread usage throughout the world. Motorcyclists seem to have a constant interest to mount on their motorcycle the best accessories which not only provide for maximum use of the motorcycle but also are attractive in appearance.

Motorcycles generally are intended to be operated by a single individual, that person being the operator. However, one such accessory that can be purchased is a second seat and that second seat is to be mounted on the frame of the motorcycle just aft of the operator's seat, and this makes the motorcycle capable of carrying not just the operator but also a passenger. Within the prior art, there are numerous structures of second seats that are commercially available.

Also included within the prior art is an accessory known as a backrest which can be mounted at the aft end of the operator's seat of the motorcycle and extend in an upward direction. This backrest has a cushion and is to provide back support for the operator of the motorcycle. There are multiple embodiments of backrests which can be purchased by motorcyclists and installed on their motorcycle.

Another accessory which is commonly used in conjunction with motorcycles is some form of a luggage rack which permits the carrying of some form of luggage. There are saddle bags that may be mounted on the sides of the motorcycle and an appropriate structure can be purchased for the mounting of these bags. There is also available on the market a luggage rack that can be mounted over the rear wheel of the motorcycle and on this rack there can be carried one or a plurality of pieces of luggage or there can be carried a container, such as a box.

These aforementioned accessories are all desirable items for motorcyclists. However, prior to the present invention, it has not been known to design a single accessory which can function as a second seat when such is needed, can function to be used as a backrest when such is needed and also can function as a luggage rack when such is needed. It is the object of the present invention to provide such an accessory.

SUMMARY OF THE INVENTION

The first basic embodiment of the present invention is directed to a combined second seat, backrest and luggage rack for a motorcycle which is constructed of a frame which is composed of a first side member and a second side member. The first side member is attached to the second side member by an adjusting link. The adjusting link is to be manually movable to vary the spacing between the first side member and the second side member. A cushion is mounted between the side members with the cushion being capable of being used as a second seat for a motorcycle.

A further embodiment of the present invention is where the first basic embodiment is modified by defining that the side members of the frames are constructed to be tubular with each of the side members being essentially a mirror image of each other.

A further embodiment of the present invention is where the first basic embodiment is modified by defining that the adjusting link comprises a turnbuckle.

A further embodiment of the present invention is where the first basic embodiment is modified by including a hinge plate assembly with the cushion being mounted on the hinge plate assembly. The cushion is separately movable relative to the frame between a horizontal position and a vertical position. With the hinge plate assembly in the horizontal position the cushion is to be usable as a second seat, and with the hinge plate assembly in the vertical position the cushion is to be usable as a backrest.

A further embodiment of the present invention is where the just previous embodiment is modified by defining that with the hinge plate assembly in the vertical position the frame is capable of being used as a luggage rack adapted to have a piece of luggage mounted thereon.

A second basic embodiment of the present invention is directed to a combined second seat, backrest and luggage rack for a motorcycle which comprises a frame with there being a hinge plate assembly mounted on the frame and the hinge plate assembly being movable between a retracted position and an extended position. The extended position is defined as being substantially vertical with the retracted position being substantially horizontal. A cushion is mounted on the hinge plate assembly. With the hinge plate assembly in the retracted position the cushion is usable as a second seat and with the hinge plate assembly in the extended position the cushion is usable as a backrest.

A further embodiment of the present invention is where the second basic embodiment is modified by defining that with the hinge plate in the extended position an aft section of the frame is capable of being used as a luggage rack.

A further embodiment of the present invention is where the second basic embodiment is modified by defining that there is a first locking means for locking the hinge plate assembly when in the retracted position and a second locking means for locking the hinge plate assembly when in an extended position. The second locking means is different from the first locking means.

A further embodiment of the present invention is where the just previous embodiment is modified by defining that the first locking means uses a single lineally movable pin which must be actuated to unlock the hinge plate assembly and the second locking means uses a pair of lineally movable pins which must be actuated simultaneously in order to unlock the hinge plate assembly.

A further embodiment of the present invention is where a previous embodiment is modified by defining that there is utilized a piece of luggage which has a pocket formed on its exterior surface. The aft section is insertable within this pocket to mount the piece of luggage on the frame. A securing strap is attached to the piece of luggage with the securing strap to be connected with the cushion to fix the piece of luggage onto the frame.

A further embodiment of the present invention comprises a third basic embodiment of combined second seat, backrest and luggage rack for a motorcycle which comprises a frame composed of a first side member and a second side member. The first side member has a first attachment and the second side member has a second attachment. Both the first attachment and the second attachment are to be used to securely mount the frame onto a motorcycle. The first side member has a first aft bar and the second side member has a second aft bar. The first aft bar is connected to the second aft bar by an adjusting link, the adjusting link is adjustable to vary the spacing between the first attachment and the second attachment. A hinge plate assembly composed of a first plate hingedly attached to a second plate is mounted on the frame with the hinge plate assembly being movable between a retracted position and an extended position. The retracted position is when the first plate is in juxtaposition with the second plate and the extended position is when the second plate is transverse to the second plate. The first plate is secured to the frame. An engagement mechanism is connected to the hinge plate assembly that locks the second plate to the first plate when in the extended position and also when in the retracted position. The cushion is mounted on the second plate. Whereby with the second plate in the extended position, the cushion functions as a backrest and with the second plate in the retracted position the cushion function as a seat.

A further embodiment of the present invention is where the third basic embodiment is modified by defining that the adjusting link comprises a turnbuckle.

A further embodiment of the present invention is where the third basic embodiment is modified by defining that the engagement mechanism comprises a first spring biased pin which is movable lineally to engage with a slot to unlock the second plate to the first plate when in the retracted position and the engagement mechanism including a second spring biased pin which is movable lineally to engage with a slot to lock the second plate to the first plate when in the extended position.

A further embodiment of the present invention is where the third basic embodiment is modified by defining that with the second plate in the extended position the first aft bar and the second aft bar are locatable in a pocket in a piece of luggage which mounts the luggage onto the frame.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 5 is a bottom plan view of the combined second seat, backrest and luggage rack of this invention;

FIG. 6 is a longitudinal cross-sectional view through the adjusting link of the combined second seat, backrest and luggage rack of this invention taken along line 6-6 of FIG. 5;

FIG. 7 is a cross-sectional view through the hinge mechanism utilized in conjunction with the first embodiment of hinge plate assembly of the combined second seat, backrest and luggage rack of this invention taken along line 7-7 of FIG. 5 showing the hinge plate assembly in the retracted position;

FIG. 8 is a longitudinal cross-sectional view through the hinging mechanism utilized within the first embodiment of hinge plate assembly taken along line 8-8 of FIG. 7;

FIG. 9 is a top plan view of the hinging mechanism of FIG. 7 with the exception that the first embodiment of hinge plate assembly is in the extended position;

FIG. 10 is a cross-sectional view taken along line 10-10 of FIG. 9 showing the first embodiment of hinge plate assembly in the extended position;

FIG. 11 is a view similar to FIG. 8 but showing a movable pin having a force applied thereto which will permit the cushion to be moved between the backrest position and the second seat position;

FIG. 12 is an isometric view of a second embodiment of hinge plate assembly of the present invention showing the hinge plate assembly in the retracted position;

FIG. 13 is a longitudinal cross-sectional view through the hinging mechanism of the second embodiment of hinge plate assembly of the present invention taken along line 13-13 of FIG. 12;

FIG. 14 is an isometric view of the second embodiment of hinge plate assembly of the present invention showing the hinge plate assembly in the extended position; and FIG. 15 is a longitudinal cross-sectional view through the hinging mechanism within the second embodiment of hinge plate assembly taken along line 15-15 of FIG. 14.

DETAILED DESCRIPTION OF THE INVENTION

Figure 1:
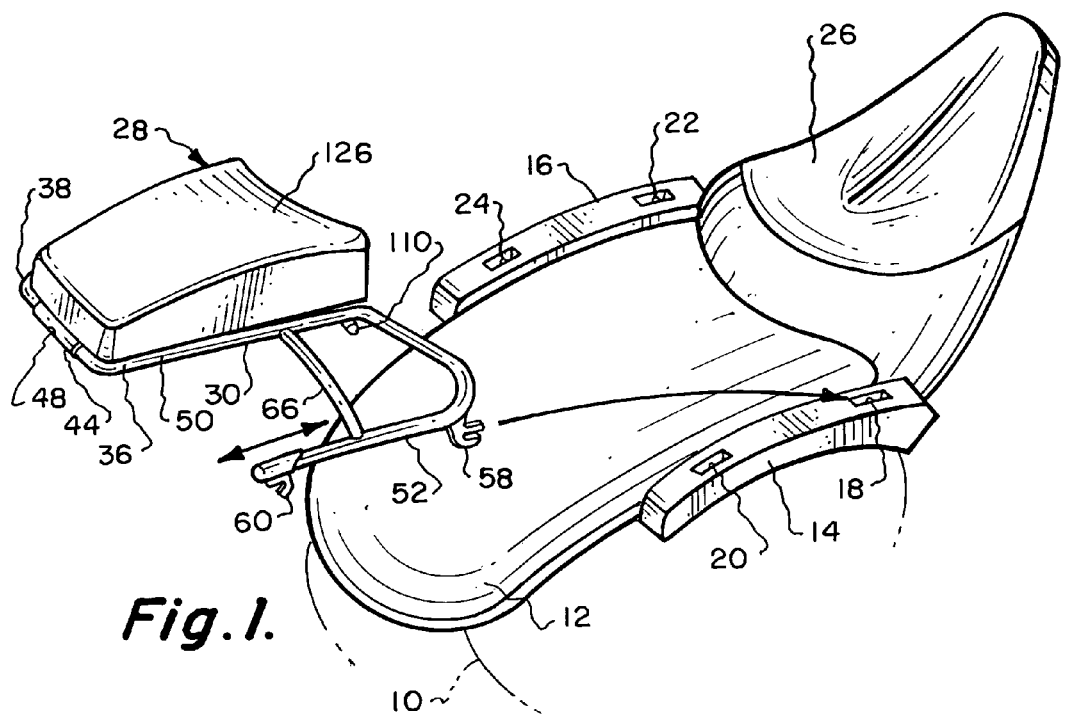
FIG. 1 is an exploded isometric view showing the combined second seat, backrest and luggage rack of this invention disconnected from the fender struts of the motorcycle.

Referring particularly to FIGS. 1-4, there is shown a rear wheel 10 of a motorcycle on which is mounted a rear fender 12. The rear fender 12 is mounted between a pair of fender struts 14 and 16 which are mounted directly to the frame of the motorcycle, which is not shown. Strut 14 has formed within its upper surface a pair of openings 18 and 20. Strut 16 has formed within its upper surface a pair of openings 22 and 24. The purpose of the openings 18, 20, 22 and 24 will be explained further on in the specification. Mounted on the frame of the motorcycle and located between the struts 14 and 16 in the forward area of the fender 12 is an operator's seat 26. The operator of the motorcycle is to occupy the seat 26.

The combined second seat, backrest and luggage rack 28 of this invention includes a frame 30. The frame 30 is constructed of metal tubular members with generally steel and aluminum being preferred. The frame 30 is composed of a right side member 32 and a left side member 34. Member 32 includes a first aft bar 36. Member 34 includes a second aft bar 38. The free end of the aft bar 36 includes a series of external screw threads 40. The free end of the aft bar second aft bar 38 includes a series of external screw threads 42. The screw threads 42 are opposite in direction to the screw threads 40. For example, if the screw threads 40 are right handed threads the screw threads 42 are left handed threads. The screw threads 40 and 42 are threadably mounted within a threaded sleeve 44. The threaded sleeve 44 includes a pair of holes 46 and 48. The sleeve 44 functions as a turnbuckle and can be turned by inserting a tool within either of the openings 46 and 48 and rotating of the sleeve 44 relative to the first aft bar 36 and the second aft bar 38 when such are in engagement within the interior of the sleeve 44. This turning movement of the sleeve 44 will cause the right side member 32 to move relative to the left side member 34. The members 32 and 34 always move opposite to each other, toward each other or away from each other. The reason for this movement is that some motorcycles are wider than others and therefore the spacing between the struts 14 and 16 varies so the distance between the members has to be adjustable to equal the distance between the struts 14 and 16. In order to have the combined second seat, backrest and luggage rack 28 of the present invention to be adaptable to motorcycles of different widths, it is necessary to have the right side member 32 adjust relative to the left side member 34.

The right side member 32 includes a first main member 50 which is integral to the first aft bar 36. The first main member 50 assumes a U-shape and integrally connects to a first bottom bar 52. In a similar manner, the second aft bar 38 is integrally connected to a second main member 54 which assumes a U-shape and integrally connects to a second bottom bar 56. Mounted on the first bottom bar 52 is a first fixed hook 58 which is fixed in place to the first bottom bar 52. A first movable hook 60 is mounted on the first bottom bar 52. The first fixed hook 58 is to be located within the opening 18 and the first movable hook 60 is to be located within the opening 20.

In a similar manner mounted on the second bottom bar 56 is a second fixed hook 62 and a second movable hook 64. The second fixed hook 62 is to be mounted within the opening 22 and the second movable hook 64 is to be mounted within the opening 24. The mounting arrangement and locking of the frame 30 onto the struts 14 and 16 is not considered to be a specific part of this patent application as such as been previously covered in U.S. Pat. No. 6,648,408 by the present inventor. Integrally connected between the first main member 50 and the first bottom bar 52 is a first brace bar 66. Integrally connected between the second main member 54 and the second bottom bar 56 is a second brace bar 68.

Integrally mounted to the first aft bar 36 and the first main member 50 is a first mounting plate 70. A second mounting plate 72 is integrally connected to the second aft bar and the second main member 54. The plates 70 and 72 are in alignment with each other in essence forming a planar surface in combination. Plate 70 includes a pair of elongated holes 74 and 76. The holes 74 and 76 are spaced apart. Plate 70 also includes a pair of elongated holes 78 and 80. It is to be noted that the plates 70 and 72 are located between the right side member 32 and the left side member 34.

There is a first embodiment of hinge plate assembly 82 which is composed of a first plate 84 and a second plate 86. The main portion of the plate 84 is planar and is to rest on the planar surface which is formed by the mounting plates 70 and 72. The first plate 84 includes four in number of elongated holes 74, 76, 78 and 80. There are four in number of circular holes (which are not specifically shown in the drawings) each of which is to connect with a bolt 88. Each of the bolts 88 is to connect with one of the holes 74, 76, 78 and 80. The circular shaped holes that are formed in the mounting plates 70 and 72 are threaded so the bolt is then threadably secured to the plates 70 and 72 thereby securely mounting the first plate 84 in position on the mounting plates 70 and 72. Because of the turnbuckle 44, the spacing between the first bottom bar 52 and a second bottom bar 56 can be varied. This variance can be compensated for by the elongation of holes 74, 76, 78 and 80 so that each of the bolts 88 will connect with their respective hole formed within the mounting plates 70 and 72.

Integrally mounted on one end of the first plate 84 are a pair of hinge sleeves 90 and 92. The sleeves 90 and 92 are spaced apart. Each of the sleeves 90 and 92 have a through opening and each of these through openings is to align with through opening 94 formed within a center sleeve 96. The through opening 98 of sleeve 90 and through opening 91 of sleeve 92 are shown within FIG. 10 of the drawings. Telescopingly mounted within the through opening 91 of the hinge sleeve 92 is a fixed pin 100. The pin 100 has an annular groove 102 located intermediate the ends of the pin 100. The inner end of the pin 100 abuts against a coil spring 104. Coil spring 104 is mounted within through opening 94 of center sleeve 96. The fixed pin 100, when it is installed in position, is to be pushed inward against compressing of the spring 104 until the annular groove 102 aligns with a gap 106 located between the hinge sleeve 92 and the center sleeve 96. A snap ring 108 is to be placed within the gap 106 and extends within the annular groove 102. The longitudinal position of the fixed pin 100 is now fixed relative to hinge sleeve 92.

The inner end of the coil spring 100 abuts against the inner end of a movable pin 110. Movable pin 110 is mounted within the through hole 98 of the hinge sleeve 90. The movable pin 110 has a transverse through slot 112. Slipped within the slot 112 is a key 114. The inner end of the key 114 includes a threaded hole 116. A bolt 118 is installed through the inner end of the movable pin 110 and threadable engages with the threaded hole 116. The purpose of the of the bolt 118 is to prevent the key 114 from falling free of the through slot 112.

The key 114 is slidably movable within the confines of a longitudinal slot 120 formed within center sleeve 96. The longitudinal slot 120 is open at the end of the center sleeve 96 that is closest to the hinge sleeve 90. Formed within the hinge sleeve 90 is an elongated notch 122 and a short notch 124. The notches 122 and 124 comprise two separate notches that are located diametrically opposite each other for each notch. However for purposes of this invention, it will be described as though it is a single notch. The same is also true for longitudinal slot 120. Because of the bias of coil spring 104, the key 114 will either be located within elongated notch 122 or the short notch 124. If the key 114 is engaged with the short notch 124, the second plate 86 will be located against the first plate 84 defining a retracted position for the hinge plate assembly 82. This will be the position of usage for a second seat and a passenger on the motorcycle can sit on the cushion 126 which is fixedly secured by a pair of screws 128 to the second plate 86. This position is clearly shown in FIGS. 1 and 2 of the drawings.

Figure 2:
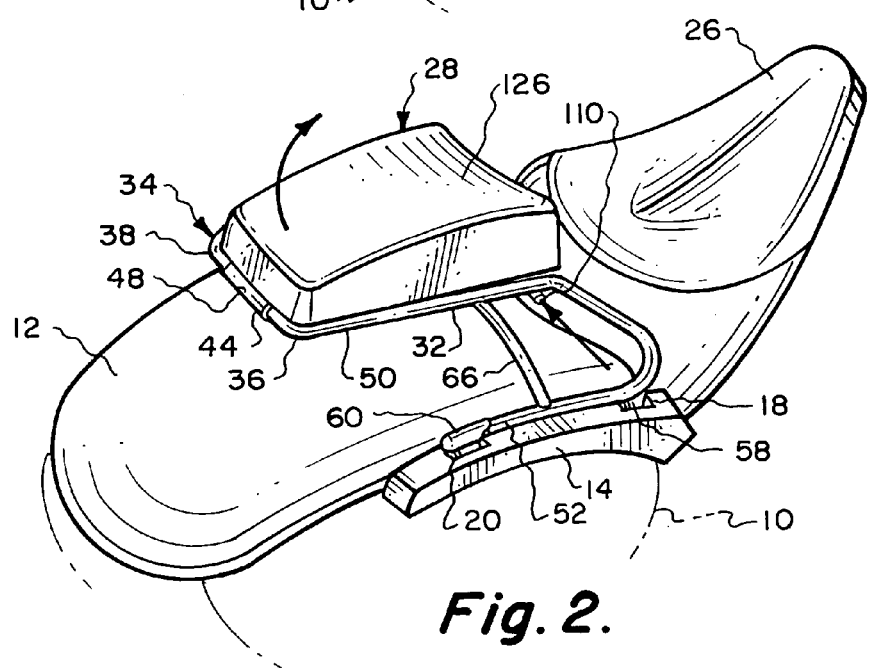
FIG. 2 is a view similar to FIG. 1 with the cushion in the position to be used as a second seat and showing the combined second seat, backrest and luggage rack of this invention mounted in conjunction with the fender struts.
Figure 3:
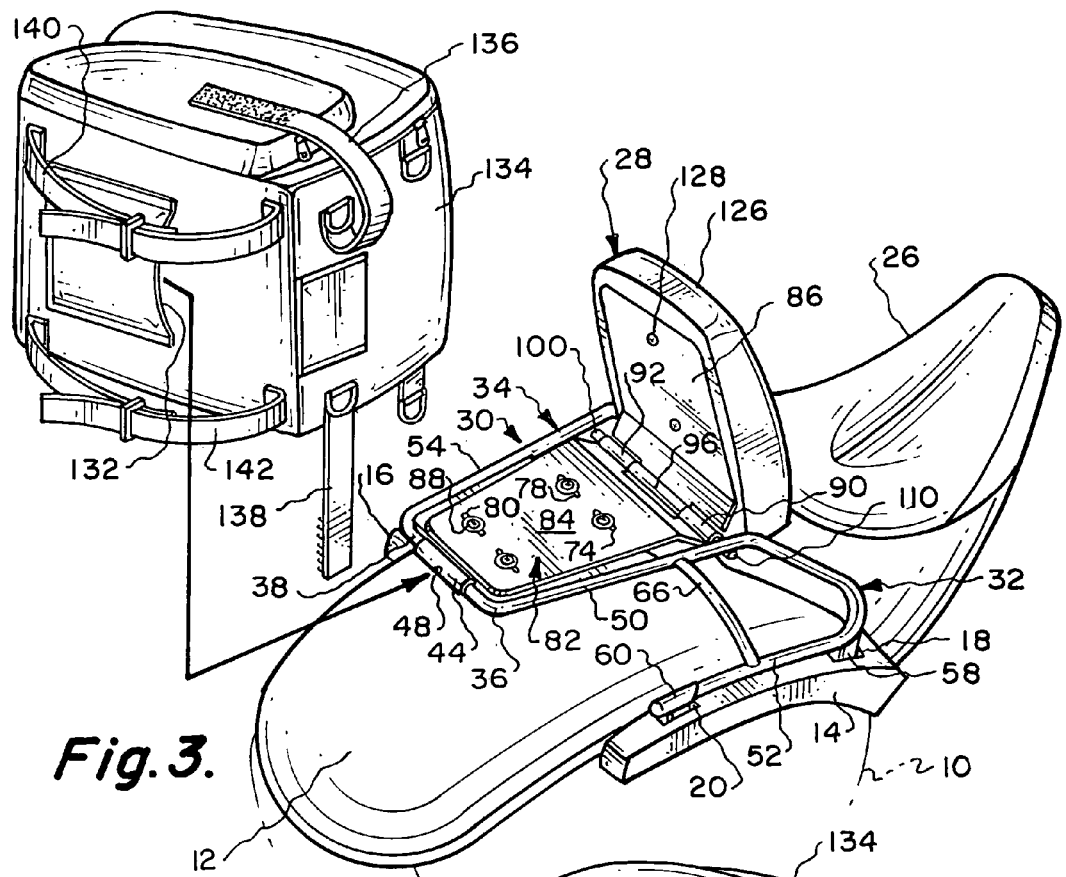
FIG. 3 is an isometric view similar to FIG. 2 but with the cushion in the backrest position and depicting the installation of a luggage bag in conjunction with the combined second seat, backrest and luggage rack of this invention.
Figure 4:
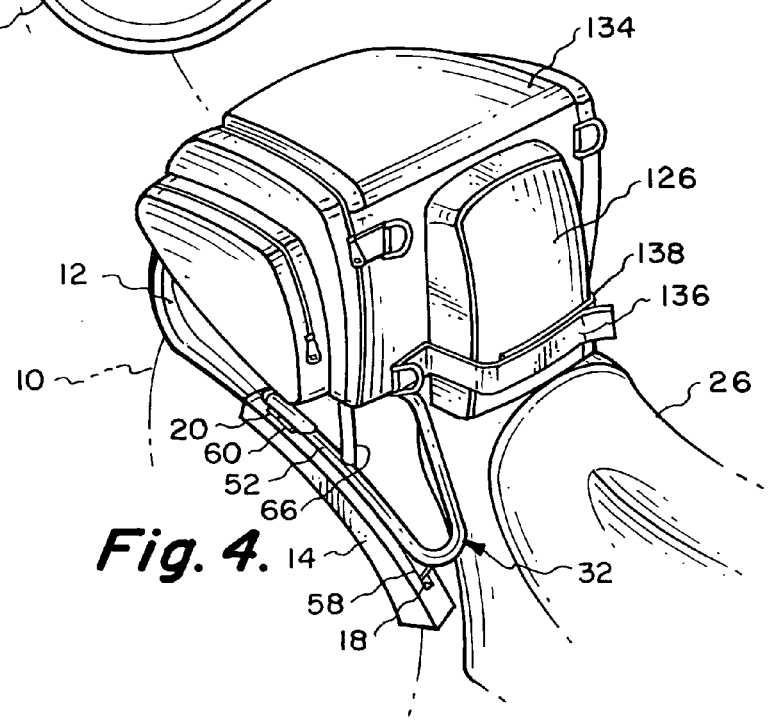
FIG. 4 is an isometric view taken from the general forward direction of the motorcycle showing the luggage bag installed on the combined second seat, backrest and luggage rack of this invention.

If a person no longer wishes to use the cushion 126 as a second seat, the person can manually grasp the outer end of the cushion 126 and pivot such clockwise, as is shown when comparing FIGS. 2 and 3. The edge of the notch 124 that comes into contact with the key 114 during this pivoting motion is slanted so as to form a cam surface that will permit the notch 124 to be ridden over the key 114 and cause the key 114 to slightly retract to become free of the hinge sleeve 90. The hinge sleeves 90 and 92 are fixed to the first plate 84. The movable sleeve 96 is fixed to the second plate 86. As the second plate 86 and the cushion 126 are pivoted, also is pivoted the movable sleeve 96. This pivoting occurs until the elongated slot 122 aligns with the key 114 and the bias of the coil spring 104 will then cause the key 114 to be pushed within the elongated slot 122. The key 114 will slide within the slot 120 of the center sleeve 96. With the key 114 connecting with the elongated notch 122, the cushion 126 and the second plate 86 are now in a vertical or transverse position, which is clearly shown in FIG. 3. The first plate 84 is in a horizontal position. This is now the position of the cushion 126 so that it can function as a backrest for the operator that is sitting on the seat 26.

Let it now be assumed that it is desired to move the cushion 126 back to function as a second seat, which is shown in FIGS. 1 and 2 of the drawings. To accomplish that, a person must apply inward pressure in the direction of arrow 130 of FIG. 9 onto movable pin 110. This will cause the coil spring 104 to be further compressed and the key 114 will be moved out of elongated notch 122 and position the key 114 almost totally confined within the longitudinal slot 120 and the key 114 is now free of the hinge sleeve 90. This will now permit the cushion 126 and the second plate 86 to be moved back to the horizontal position, which is shown in FIGS. 1 and 2. At this time, the key 114 will now reengage with notch 124.

FIG. 8 is a cross-sectional view which shows the position of the movable pin 110 in its normal at-rest position. The key 114 is engaged with the short notch 124 in this position. In FIG. 11, the same structure is shown as in FIG. 8 except the force is now applied as indicated by arrow 130 against the movable pin 110 and has moved the key 114 out of the elongated notch 122. In FIG. 11, the key 114 is not yet engaged with the short notch 124. In FIG. 11, the cushion 126 has not yet been pivoted to the horizontal position.

When the cushion 126 is in the position of a backrest, as shown in FIG. 3, the first aft bar 36, second aft bar 38, first main member 50 and second main member 54 along with the first plate 84 can now be used as a luggage rack. The aforementioned parts can be inserted within pocket 132 of a luggage bag 134. The luggage bag 134 is now transversely fixed in position relative to the combined second seat, backrest and luggage rack 28 of this invention. In order to fix the luggage bag 134 longitudinally, there is utilized securing strap 136 which is mounted on the bag 134 to be located around the cushion 126 and secured with strap 138, which is deemed to be part of the securing strap. The two ends of the straps 136 and 138 can be secured through the use of a hook and eye fastening arrangement, which is deemed to be conventional. The bag 134 is to also include carry straps 140 and 142 which will permit the bag 134 to be carried by a passenger when the cushion 126 is being used as a second seat. When there is no passenger and the cushion 126 is in the vertical or extended position as shown in FIG. 3, the bag 134 can be mounted on the combined second seat, backrest and luggage rack 28 of this invention, as previously described.

Referring particularly to FIGS. 12-15 of the drawings, there is shown a second embodiment of hinge plate assembly 144. The second embodiment of hinge plate assembly 144 includes a first hinge plate 146 and a second hinge plate 148. The hinge plates 146 and 148 are basically identical to the previously described hinge plates 86 and 84 respectively of the first embodiment of hinge plate assembly 82. It is also to be understood that the second embodiment of hinge plate assembly 144 will operate basically similar to the first embodiment of hinge plate assembly 82. The first hinge plate 146 includes a similar series of mounting holes 150 and the second hinge plate 148 also includes a similar series of mounting holes 152.

The first hinge plate 146 has at one end thereof a pair of hinge sleeves 154 and 156. Each of the hinge sleeves 154 and 156 have respective through openings 158 and 160. The longitudinal center axes of the through openings 158 and 160 are in alignment. There is a center sleeve 162 integrally connected to the second hinge plate 148. The longitudinal center axis of the center sleeve 162 is to be in alignment with the longitudinal center axes of the hinge sleeves 154 and 156 and is located therebetween. This arrangement is clearly shown in FIGS. 12-15.

Formed within the hinge sleeve 154 is a cutout notch 164. This cutout notch is open at the edge of the hinge sleeve 154 which is directly adjacent the center sleeve 162. In a similar manner, the hinge sleeve 156 includes a pair of cutout notches 166 and 168. Again, each of the cutout notches 166 and 168 are open at the edge that is directly adjacent the center sleeve 162.

A pin 170 is slidingly lineally mounted within the through opening 158. A similar pin 172 is slidingly lineally mounted within the through opening 160. The center sleeve 162 includes a through opening 174 and both a portion of pin 170 and pin 172 are located within the through opening 174. Located within the through opening 174 and located between the pins 170 and 172 is a coil spring 176.

A pair of bolt fasteners 178 and 180 are fixedly mounted to the pin 170 with the heads of the fasteners 178 and 180 located exteriorly of the pin 170 and connecting with a slot 192 that is formed within the center sleeve 162. Fixedly mounted to the pin 172 are a pair of bolt fasteners 184 and 186 with the heads of these fasteners extending exteriorly at the pin 172 and connecting with a slot 188 that is formed within the center sleeve 162.

The second embodiment of hinge plate assembly 144 is to be used in the same manner as the first embodiment of hinge plate assembly 82 in that a backrest cushion will be mounted on the second hinge plate 148. The first hinge plate 146 is to be mounted on a frame similar to frame 30.

Let it be assumed that the hinge plate assembly 144 is in the position shown in FIG. 12. This would be the position that would be usable by an individual sitting on the cushion that is mounted on the second hinge plate 148 when it is mounted on a motorcycle. The spring 176 has caused bolt fastener 186 to be located within cutout notch 166 of the hinge sleeve 156. This is defined as the first locking means. As a result, the hinge plates 146 and 148 are locked relative to each other and movement of hinge plate 148 from hinge plate 146 to the backrest position is not permitted.

Now let it be assumed that the operator wishes to move the second hinge plate 148 to the backrest position. That operator must apply an inward force in the direction of arrow 190 only on the pin 172 (not on pin 170) which will cause fastener 186 to be removed from slot 166 with the result that bolt fasteners 184 and 186 are totally confined within the slot 188. This will now permit pivoting movement of the second hinge plate 148 relative to the first hinge plate 146 until the second hinge plate 148 assumes a maximum pivoted position of about sixty degrees relative to the first hinge plate 146. This position is clearly shown in FIG. 14. At this time, the bias of the coil spring 176 will cause bolt fastener 186 to engage with cutout notch 168 and also at the same time cause bolt fastener 178 to engage with cutout notch 164. As a result, there is a double locking action which has occurred of the second hinge plate 148 when in the extended position. This is defined as the second locking means. This is desirable to insure that there is no possibility of breakage or disconnection of the locking mechanism when in the extended position and the hinge plate 148 is used as a backrest by the operator on the motorcycle.

Let it now be assumed that the operator wishes to move the hinge plate 148 back to a closed position, as shown in FIG. 12. In order to do so, the operator must apply a force on pin 172 in the direction of arrow 192 and at the same time apply a force on the pin 170 in the direction of arrow 194. This will cause the fastener 186 to become dislodged from cutout notch 168 and at the same time fastener 178 becoming dislodged from cutout notch 164. Pivoting movement of the second hinge plate 148 back to the closed position (being in juxtaposition with the first hinge plate 146) is now permitted at which time the bolt fastener 166 will not reengage with cutout notch 166.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A combined second seat, backrest and luggage rack for a motorcycle comprising:

a frame composed of a first side member and a second side member, said first side member having a first attachment, said second side member having a second attachment, said first attachment and said second attachment to be used to securely mount said frame onto a motorcycle, said first side member having a first aft bar, said second side member having a second aft bar, said first aft bar being connected to said second aft bar by an adjusting link, said adjusting link being adjustable to vary the spacing between said first attachment and said second attachment;

a hinge plate assembly composed of a first plate hingedly attached to a second plate, said hinge plate assembly being movable between a retracted position and an extended position, said retracted position being when said first plate is in juxtaposition with said second plate, said extended position is when said second plate is transverse to said first plate, said first plate being secured to said frame, an engagement mechanism connected to said hinge plate assembly that locks said second plate to said first plate when in said extended position, said mechanism being manually operable to unlock said second plate and permit said second plate to be pivotally moved relative to said first plate to said retracted position where said engagement mechanism again locks said second plate to said first plate; and a cushion mounted on said second plate, whereby with said second plate in said extended position said cushion functions as a backrest, with said second plate in said retracted position said cushion functions as a seat.

2. The combined second seat, backrest and luggage rack for a motorcycle as defined in claim 1 wherein:

said adjusting link comprising a turnbuckle.

3. The combined second seat, backrest and luggage rack for a motorcycle as defined in claim 1 wherein:

said engagement mechanism comprising a first spring biased pin which is movable to engage lineally with a slot to lock said second plate to said first plate when in said retracted position, said engagement mechanism including a second spring biased pin which is movable lineally to engage with a slot to lock said second plate to said first plate when in said extended position.

4. The combined second seat, backrest and luggage rack for a motorcycle as defined in claim 1 wherein:

with said second plate in said extended position said first aft bar and said second aft bar are locatable in a pocket in a piece of luggage which mounts the luggage on said frame.

\* \* \* \* \*